(12) United States Patent
Yamate (10) Patent No.: US 9,790,400 B2
(45) Date of Patent: Oct. 17, 2017

(54) ORGANIC-INORGANIC COMPLEX, AND FORMING COMPOSITION THEREOF

(71) Applicant: NIPPON SODA CO., LTD., Tokyo (JP)

(72) Inventor: Taiki Yamate, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 46 days.

(21) Appl. No.: 15/156,092

(22) Filed: May 16, 2016

(65) Prior Publication Data

US 2016/0257851 A1 Sep. 8, 2016

Related U.S. Application Data

(62) Division of application No. 14/410,424, filed as application No. PCT/JP2013/004196 on Jul. 5, 2013.

(30) Foreign Application Priority Data

Jul. 10, 2012 (JP) .................................. 2012-154492

(51) Int. Cl.

| C09D 183/06 | (2006.01) |
|---|---|
| C09D 183/04 | (2006.01) |
| C08L 83/04 | (2006.01) |
| C08K 5/5419 | (2006.01) |
| C08G 77/18 | (2006.01) |

(52) U.S. Cl.
CPC ............ C09D 183/04 (2013.01); C08L 83/04 (2013.01); C09D 183/06 (2013.01); C08G 77/18 (2013.01); C08K 5/5419 (2013.01)

(58) Field of Classification Search
CPC .................................. C07F 7/18; C09D 183/06
See application file for complete search history.

(56) References Cited

U.S. PATENT DOCUMENTS

| 2003/0100669 A1* | 5/2003 | Lewis | .................. | C09D 183/04 |
|---|---|---|---|---|
| | | | | 524/588 |
| 2008/0090926 A1 | 4/2008 | Kang et al. | | |
| 2010/0036012 A1* | 2/2010 | Kimura | ...................... | C08F 2/44 |
| | | | | 522/172 |
| 2014/0256878 A1 | 9/2014 | Yoshiwara | | |

FOREIGN PATENT DOCUMENTS

| CN | 101547947 A | 9/2009 |
|---|---|---|
| EP | 2 602 268 A1 | 6/2013 |
| JP | 6-9728 A | 1/1994 |
| JP | H10-195417 A | 7/1998 |
| JP | 2000-169755 A | 6/2000 |
| JP | 2000-297126 A | 10/2000 |
| JP | 2000-336281 A | 12/2000 |
| JP | 2002-363494 A | 12/2002 |
| JP | 2006-192634 A | 7/2006 |
| JP | 2006-329875 A | 12/2006 |
| JP | 2010-106240 A | 5/2010 |
| JP | 2011-132322 | 7/2011 |
| JP | 2012-193265 A | 10/2012 |
| WO | 2006/088079 A1 | 8/2006 |
| WO | 2008/069217 A1 | 6/2008 |
| WO | 2013-018506 A1 | 2/2013 |
| WO | 2013/021631 A1 | 2/2013 |

OTHER PUBLICATIONS

Aug. 27, 2013 International Search Report issued in Application No. PCT/JP2013/004196.
Jan. 13, 2015 International Preliminary Report on Patentability issued in Application No. PCT/JP2013/004196.
Dec. 4, 2015 Extended European Search Report issued in European Application No. 13816684.8.

* cited by examiner

*Primary Examiner* — Kuo-Liang Peng
(74) *Attorney, Agent, or Firm* — Oliff PLC (57) ABSTRACT

An organic-inorganic complex-forming composition that includes: a) an organic silicon compound represented by $R_nSiX_{4-n}$ wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different and having a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more (Si1), and/or a condensate thereof; and b) a thermosetting compound (excluding an olefin polymer).

4 Claims, 3 Drawing Sheets

ORGANIC-INORGANIC COMPLEX, AND FORMING COMPOSITION THEREOF

CROSS-REFERENCE TO PRIOR APPLICATIONS

This is a continuation of application Ser. No. 14/410,424 filed Dec. 22, 2014, which is a National Stage Application of PCT/JP2013/004196 filed Jul. 5, 2013, and claims the benefit of Japanese Application No. 2012-154492 filed Jul. 10, 2012. The entire disclosures of the prior applications are hereby incorporated by reference herein in their entirety.

TECHNICAL FIELD

The present invention relates to an organic-inorganic complex in which a cured material of a thermosetting compound is blended, and a forming composition thereof.

This application claims priority to Japanese Patent Application No. 2012-154492 filed on Jul. 10, 2012, the content of which is incorporated herein.

BACKGROUND ART

Currently, a trifunctional silane is mainly used as a raw material of a commercial silane-based coating agent, and a polysiloxane having moderate hardness and flexibility is formed by such a trifunctional silane. However, a hard coating property of a film of a trifunctional silane is not sufficient. Therefore, a tetrafunctional silane and colloidal silica are mixed with the trifunctional silane to compensate the hard coating property, but there is a problem that, if the film is cured, the film easily cracks and adhesiveness becomes worse.

As a silane-based coating agent, for example, an antifouling film forming composition containing a trifunctional alkoxysilane compound having an epoxy group (patent document 1) is used. In addition, a silane-based coating agent containing a photocatalyst is also proposed, and a film is cured by using a photo-acid-generating agent, a cross-linking agent, a curing catalyst, or the like (for example, patent documents 2 and 3). Furthermore, a silane-based organic-inorganic complex gradient material having a component gradient structure in which the content rate of a metal-based compound in the material continuously changes in the depth direction from the surface of the material is also proposed (for example, patent document 4).

Patent document 5 discloses that, by irradiating an organic silicon compound with ultraviolet rays in the presence of a photosensitive compound, an organic-inorganic complex in which the surface has very high hardness and the inside and the back surface side have appropriate hardness and which excels in adhesiveness to a base substance can be provided, and furthermore, patent document 6 discloses that, by blending an acrylate-based resin that is an ultraviolet curable resin in a polysiloxane-based organic-inorganic complex, an organic-inorganic complex in which the surface has very high hardness and which excels in adhesiveness to a base substance and humidity resistance can be provided.

Conventionally, a problem has been that, in a decoratively-deposited plastic container or the like, poor adhesion often occurs between a metal deposited film and the plastic container, thereby causing peeling of the deposited film. Therefore, in order to achieve good adhesiveness, an anchor coat (base film) is needed between the metal deposited film and the plastic container. Currently, as the anchor coat, one layer is insufficient, and a two-layer structure with a layer (A) having good adhesiveness to the plastic container and a layer (B) having good adhesiveness to both the above-described (A) and the metal deposited film is needed. However, a problem was that manufacturing cost is increased and a high degree of skill is required by increasing the number of layers. Therefore, an anchor coat agent that can be used as an anchor coat for a plastic container and an inorganic film by one layer has been studied, but an organic-inorganic complex film disclosed in patent document 6 requires UV irradiation, and a problem was that a uniform UV irradiation technique for a three-dimensional plastic container is needed.

PRIOR ART DOCUMENTS

Patent Documents

Patent Document 1: Japanese unexamined Patent Application Publication No. 10-195417
Patent Document 2: Japanese unexamined Patent Application Publication No. 2002-363494
Patent Document 3: Japanese unexamined Patent Application Publication No. 2000-169755
Patent Document 4: Japanese unexamined Patent Application Publication No. 2000-336281
Patent Document 5: WO2006/088079 Pamphlet
Patent Document 6: WO2008/069217 Pamphlet

SUMMARY OF THE INVENTION

Object to be Solved by the Invention

It is an object of the present invention to provide an anchor coat agent that can be used as an anchor coat between a base substance and a metal deposited film or the like in thermal curing treatment.

Means to Solve the Object

The present inventor has addressed the above-described object and diligently studied, and as a result, found that, by blending an organic silicon compound and/or a condensate thereof and a thermosetting compound, using a solubility parameter (SP value) of an organic group having a carbon atom directly bonded to Si of the organic silicon compound as an index, a segregation layer of a polysiloxane is self-organizationally formed on the surface layer, and the blend can be used as an anchor coat between a base substance and a metal deposited film or the like by one layer, to complete the present invention.

Specifically, the present invention relates to:
(1) An organic-inorganic complex-forming composition comprising:
a) an organic silicon compound that is at least one represented by formula (I)

$$R_nSiX_{4-n} \quad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different) and having a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more (Si1), and/or a condensate thereof; and b) a thermosetting compound (excluding an olefin polymer); and

(2) An organic-inorganic complex-forming composition comprising:
a) an organic silicon compound that is at least one represented by formula (I)

$$R_nSiX_{4-n} \qquad (I)$$

(wherein R represents an organic group having a carbon atom directly bonded to Si, X represents a hydroxyl group or a hydrolyzable group; and n represents 1 or 2, wherein when n is 2, each R is the same or different, and when (4−n) is 2 or more, each X is the same or different), wherein a molar ratio of an organic silicon compound (Si1) in which a solubility parameter (SP1) of R obtained by Fedors' estimation method is smaller than a solubility parameter (SP2) of a thermosetting compound obtained by Fedors' estimation method, and a difference between the SP1 and the SP2 is 1.6 or more to an organic silicon compound (Si2) in which SP1 is smaller than SP2 and the difference between the SP1 and the SP2 is less than 1.6 or an organic silicon compound (Si2) in which SP1 is larger than SP2 (Si1:Si2) is 5:5 to 10:0, and/or a condensate thereof; and
b) a thermosetting compound (excluding an olefin polymer).
In addition, the present invention relates to:
(3) An organic-inorganic complex comprising:
a) a condensate of an organic silicon compound that is at least one represented by formula (I)

$$R_nSiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different) and having a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more (Si1); and
b) a cured material of the thermosetting compound (excluding a cured material of an olefin polymer); and (4) An organic-inorganic complex comprising:
a) a condensate of an organic silicon compound that is at least one represented by formula (I)

$$R_nSiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different), wherein a molar ratio of an organic silicon compound (Si1) in which a solubility parameter (SP1) of R obtained by Fedors' estimation method is smaller than a solubility parameter (SP2) of a thermosetting compound obtained by Fedors' estimation method, and a difference between the SP1 and the SP2 is 1.6 or more to an organic silicon compound (Si2) in which SP1 is smaller than SP2 and the difference between the SP1 and the SP2 is less than 1.6 or an organic silicon compound (Si2) in which SP1 is larger than SP2 (Si1:Si2) is 5:5 to 10:0; and
b) a cured material of the thermosetting compound (excluding a cured material of an olefin polymer).
Furthermore, the present invention relates to:
(5) A laminated body obtained by applying the organic-inorganic complex-forming composition according to the above-described (1) or (2) to a substrate.

Effect of the Invention

By using, as an anchor coat agent, an organic-inorganic complex forming composition in which an organic silicon compound having a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more as the organic silicon compound, and a thermosetting compound is blended, a segregation layer of a polysiloxane can be self-organizationally formed on the surface layer, and a base substance and an inorganic film or the like can be laminated with a one-layer anchor coat layer.

MODE OF CARRYING OUT THE INVENTION

Organic-Inorganic Complex-Forming Composition

An organic-inorganic complex-forming composition of the present invention comprises:
a) an organic silicon compound that is at least one represented by formula (I)

$$R_nSiX_{4-n} \qquad (I)$$

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X is the same or different) and having a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more (Si1) (hereinafter, sometimes simply referred to as an organic silicon compound), and/or a condensate thereof; and
b) a thermosetting compound (excluding an olefin polymer).
The organic-inorganic complex-forming composition of the present invention may comprise a silanol condensation catalyst, water, and/or other solvents and the like in addition to the above-described components.
The solid content (the organic silicon component, the silanol condensation catalyst component, the thermosetting compound, and other components added as needed) in the organic-inorganic complex-forming composition of the present invention is preferably 1 to 75 mass %, more preferably 1 to 60 mass %, and further preferably 10 to 60 mass %.
(Organic Silicon Compound)
In formula (I) of the organic silicon compound of the present invention, R and X are each as follows.

R represents an organic group having a carbon atom directly bonded to Si. Examples of such an organic group can include a hydrocarbon group which may be substituted and a group consisting of a polymer of hydrocarbon which may be substituted. Specific examples include a hydrocarbon group having 1 to 30 carbon atoms, which may be substituted, and a straight chain or branched chain alkyl group having 1 to 10 carbon atoms, which may be substituted, an alkyl group having a chain longer than 10 carbon atoms, a cycloalkyl group having 3 to 8 carbon atoms, which may be substituted, a straight chain or branched chain alkenyl group having 2 to 10 carbon atoms, which may be substituted, or a cycloalkenyl group having 3 to 8 carbon atoms, which may be substituted, is preferable, and in addition, the organic group may be a hydrocarbon group having an aromatic ring.

In addition, such an organic group may comprise an oxygen atom, a nitrogen atom, or a silicon atom, and may be a group comprising a polymer such as a polysiloxane, a polyvinylsilane, or a polyacrylsilane. Examples of a substituent of "which may be substituted" can include a halogen atom and a methacryloxy group, and examples of the halogen atom include a fluorine atom, a chlorine atom, a bromine atom, and an iodine atom.

The "alkyl group having 1 to 10 carbon atoms" includes a straight chain or branched chain alkyl group having 1 to 10 carbon atoms, examples thereof include a methyl group, an ethyl group, a n-propyl group, an isopropyl group, a n-butyl group, an isobutyl group, a s-butyl group, a t-butyl group, a n-pentyl group, an isopentyl group, a neopentyl group, a 2-methylbutyl group, a 2,2-dimethylpropyl group, a n-hexyl group, an isohexyl group, a n-heptyl group, a n-octyl group, a nonyl group, an isononyl group, and a decyl group, and examples of the alkyl group having a chain longer than 10 carbon atoms include a lauryl group, a tridecyl group, a myristyl group, a pentadecyl group, a palmityl group, a heptadecyl group, and a stearyl group.

Examples of the "cycloalkyl group having 3 to 8 carbon atoms" include a cyclopropyl group, a cyclobutyl group, a cyclopentyl group, a cyclohexyl group, a cycloheptyl group, and a cyclooctyl group.

The "straight chain or branched chain alkenyl group having 2 to 10 carbon atoms" means a straight chain or branched chain alkenyl group having 2 to 10 carbon atoms, which has a carbon-carbon double bond at any one or more positions, and examples thereof include an ethenyl group, a prop-1-en-1-yl group, a prop-2-en-1-yl group, a prop-1-en-2-yl group, a but-1-en-1-yl group, a but-2-en-1-yl group, a but-3-en-1-yl group, a but-1-en-2-yl group, a but-3-en-2-yl group, a pent-1-en-1-yl group, a pent-4-en-1-yl group, a pent-1-en-2-yl group, a pent-4-en-2-yl group, a 3-methyl-but-1-en-1-yl group, a hex-1-en-1-yl group, a hex-5-en-1-yl group, a kept-1-en-1-yl group, a kept-6-en-1-yl group, an oct-1-en-1-yl group, an oct-7-en-1-yl group, and a buta-1,3-dien-1-yl group.

The "cycloalkenyl group having 3 to 8 carbon atoms" means an alkenyl group having 3 to 8 carbon atoms, which has a carbon-carbon double bond at any one or more positions and has a cyclic moiety, and examples thereof include a 1-cyclopenten-1-yl group, a 2-cyclopenten-1-yl group, a 1-cyclohexen-1-yl group, a 2-cyclohexen-1-yl group, and a 3-cyclohexen-1-yl group.

Examples of the hydrocarbon group having an aromatic ring include an "aryl group," an "arylalkyl group," and an "arylalkenyl group."

Examples of the "aryl group" include an aryl group having 6 to 10 carbon atoms, and include a phenyl group and a naphthyl group.

Examples of the "arylalkyl group" include a group in which an aryl group having 6 to 10 carbon atoms and an alkyl group having 1 to 8 carbon atoms are bound, and examples of the $C_{6-10}$ aryl $C_{1-8}$ alkyl group include a benzyl group, a phenethyl group, a 3-phenyl-n-propyl group, a 4-phenyl-n-butyl group, a 5-phenyl-n-pentyl group, an 8-phenyl-n-octyl group, and a naphthylmethyl group.

Examples of the "arylalkenyl group" include a group in which an aryl group having 6 to 10 carbon atoms and an alkenyl group having 2 to 8 carbon atoms are bound, and examples thereof include a styryl group, a 3-phenyl-prop-1-en-1-yl group, a 3-phenyl-prop-2-en-1-yl group, a 4-phenyl-but-1-en-1-yl group, a 4-phenyl-but-3-en-1-yl group, a 5-phenyl-pent-1-en-1-yl group, a 5-phenyl-pent-4-en-1-yl group, an 8-phenyl-oct-1-en-1-yl group, an 8-phenyl-oct-7-en-1-yl group, and a naphthylethenyl group.

Examples of the "hydrocarbon group having an oxygen atom" include a group having an oxirane ring (epoxy group), such as an alkoxyalkyl group, an epoxy group, an epoxyalkyl group, or a glycidoxyalkyl group, an acryloxymethyl group, and a methacryloxymethyl group.

Here, the "alkoxyalkyl group" is usually a group in which an alkoxy group having 1 to 6 carbon atoms and an alkyl group having 1 to 6 carbon atoms are bound, and examples thereof include a methoxymethyl group, a 2-methoxyethyl group, and a 3-ethoxy-n-propyl group.

Here, as the "epoxyalkyl group," a straight chain or branched chain epoxyalkyl group having 3 to 10 carbon atoms is preferable, and examples thereof include straight chain alkyl groups comprising an epoxy group, such as a glycidyl group, a glycidylmethyl group, a 2-glycidylethyl group, a 3-glycidylpropyl group, a 4-glycidylbutyl group, a 3,4-epoxybutyl group, a 4,5-epoxypentyl group, and a 5,6-epoxyhexyl group; and branched alkyl groups comprising an epoxy group, such as a β-methylglycidyl group, a β-ethylglycidyl group, a β-propylglycidyl group, a 2-glycidylpropyl group, a 2-glycidylbutyl group, a 3-glycidylbutyl group, a 2-methyl-3-glycidylpropyl group, a 3-methyl-2-glycidylpropyl group, a 3-methyl-3,4-epoxybutyl group, a 3-ethyl-3,4-epoxybutyl group, a 4-methyl-4,5-epoxypentyl group, and a 5-methyl-5,6-epoxyhexyl group.

Examples of the "glycidoxyalkyl group" include a glycidoxymethyl group and a glycidoxypropyl group.

As the group having a nitrogen atom, a group having —NR'$_2$ (wherein R' represents a hydrogen atom, an alkyl group, or an aryl group, and each R' may be the same as or different from each other) or a group having —N=CR''$_2$ (wherein R'' represents a hydrogen atom or an alkyl group, and each R'' may be the same as or different from each other) is preferable, examples of the alkyl group include the same ones as described above, and examples of the aryl group include a phenyl group, a naphthyl group, an anthracen-1-yl group, and a phenanthren-1-yl group.

Examples of the group having —NR'$_2$ include a —CH$_2$—NH$_2$ group, a —C$_3$H$_6$—NH$_2$ group, and a —CH$_2$—NH—CH$_3$ group. Examples of the group having —N=CR''$_2$ include a —CH$_2$—N=CH—CH$_3$ group, a —CH$_2$—N=C(CH$_3$)$_2$ group, and a —C$_2$H$_4$—N=CH—CH$_3$ group.

Among the above, a group having a vinyl group, the group having an oxirane ring, the group having —NR'$_2$ (wherein R' represents a hydrogen atom, an alkyl group, or an aryl group, and each R' may be the same as or different from each other), or the group having —N=CR''$_2$ (wherein R'' represents a hydrogen atom or an alkyl group, and each R'' may be the same as or different from each other) can be preferably used when the film surface is desired to be more fully mineralized.

Here, examples of the group having a vinyl group include groups having groups having alkenyl groups such as an ethenyl group (vinyl group), a prop-2-en-1-yl group, a but-3-en-1-yl group, a pent-4-en-1-yl group, a hex-5-en-1-yl group, a kept-6-en-1-yl group, and an oct-7-en-1-yl group, and vinylcarbonyl groups such as a methacrylmethyl group, an acryloxymethyl group, and a methacryloxymethyl group. The group having an oxirane ring, the group having —NR′$_2$, and the group having —N=CR″$_2$ are as described above.

In addition, in formula (I) of the organic silicon compound, n represents 1 or 2, and one having n=1 is particularly preferable. Each R may be the same or different when n is 2. In addition, these can be used singly or in combinations of two or more.

X represents a hydroxyl group or a hydrolyzable group. Each X may be the same or different when (4−n) in formula (I) is 2 or more. The hydrolyzable group means, for example, a group that can be hydrolyzed by being heated at 25° C. to 100° C. in the coexistence of excess water without a catalyst to produce a silanol group, or a group that can form a siloxane condensate, specific examples thereof can include an alkoxy group, an acyloxy group, a halogen atom, and an isocyanate group, and an alkoxy group having 1 to 4 carbon atoms or an acyloxy group having 1 to 6 carbon atoms is preferable.

Here, examples of the alkoxy group having 1 to 4 carbon atoms include a methoxy group, an ethoxy group, a n-propoxy group, an isopropyloxy group, a n-butoxy group, an isobutoxy group, and a t-butoxy group, and examples of the acyloxy group having 1 to 6 carbon atoms (the number of carbon atoms does not include carbon of a carbonyl group) include an acetyloxy group and a benzoyloxy group. Examples of the halogen atom include a fluorine atom, a chlorine atom, a bromine atom, and an iodine atom.

The organic silicon compound used in the present invention has a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more (Si1). The difference between SP1 and SP2 is preferably 1.6 to 8.5, and more preferably 1.6 to 7.2.

The organic silicon compound used in the present invention may further comprise one having SP1 smaller than SP2 and the difference between the SP1 and the SP2 is less than 1.6 or one having SP1 larger than SP2 (Si2), and a ratio of Si1 to Si2 (Si1:Si2) is 5:5 to 10:0, and preferably 9:1 to 10:0.

Here, the solubility parameter (SP value) is one calculated based on the following Fedors' estimation method.

SP value($\delta$)=($E_v$/v)$^{1/2}$=($\Sigma\Delta e_i/\Sigma\Delta v_i$)    Fedors' equation:

$^{1/2}E_v$: evaporation energy
v: molar volume
$\Delta e_i$: evaporation energy of atom or atom group of each component
$\Delta v_i$: molar volume of each atom or atom group The evaporation energy and the molar volume of each atom or atom group, which are used for calculation of the above-described equation, can refer to R. F. Fedors, Polym. Eng. Sci., 14, 147 (1974).

Therefore, the organic silicon compound used in the present invention varies depending on the kind of the thermosetting compound used in the present invention. Since the solubility parameters (SP values) of the organic silicon compound and the thermosetting compound can be calculated based on Fedors' estimation method, the combination of the organic silicon compound and the thermosetting compound can be determined based on SP values calculated in advance.

For example, when polybutadiene (SP value of 8.5) is used as the thermosetting compound, examples of the organic silicon compound whose SP value is smaller than the SP value of polybutadiene by 1.6 or more include methyltrichlorosilane, methyltrimethoxysilane, methyltriethoxysilane, methyltributoxysilane, ethyltrimethoxysilane, ethyltriisopropoxysilane, ethyltri(n-butoxy)silane, dimethyldichlorosilane, dimethyldimethoxysilane, dimethyldiaminosilane, and dimethyldiacetoxysilane (all of these having SP value of 6.9 or less).

In addition, examples of the organic silicon compound whose SP value is smaller than the SP value of the olefin polymer by less than 1.6 or the organic silicon compound whose SP value is larger than the SP value of the olefin polymer include trifluoromethyltrimethoxysilane, vinyltrimethoxysilane, methyltri(meth)acryloxysilane, methyltris[2-(meth)acryloxyethoxy]silane, methyltriglycidyloxysilane, methyltris(3-methyl-3-oxetanemethoxy)silane, vinyltrichlorosilane, vinyltriethoxysilane, n-butyltrimethoxysilane, pentafluorophenyltrimethoxysilane, phenyltrimethoxysilane, nonafluoro-n-butylethyldimethoxysilane, diphenyldimethoxysilane, di-n-butyldimethoxysilane, 3-(meth)acryloxy-n-propyltrimethoxysilane, 3-(3-methyl-3-oxetanemethoxy)-n-propyltrimethoxysilane, oxacyclohexyltrimethoxysilane, 2-(3,4-epoxycyclohexyl)ethyltrimethoxysilane, 3-glycidyloxy-n-propyltrimethoxysilane, 3-glycidyloxy-n-propylmethyldiethoxysilane, 3-glycidyloxy-n-propyltriethoxysilane, p-styryltrimethoxysilane, 3-methacryloxy-n-propylmethyldimethoxysilane, 3-methacryloxy-n-propyltrimethoxysilane, 3-methacryloxy-n-propylmethyldiethoxysilane, 3-methacryloxy-n-propyltriethoxysilane, 3-acryloxy-n-propyltrimethoxysilane, N-(2-aminoethyl)-3-amino-n-propylmethyldimethoxysilane, N-(2-aminoethyl)-3-amino-n-propyltrimethoxysilane, N-(2-aminoethyl)-3-amino-n-propyltriethoxysilane, 3-amino-n-propyltrimethoxysilane, 3-amino-n-propyltriethoxysilane, 3-(N-1,3-dimethyl-butylidene)amino-n-propyltriethoxysilane, N-phenyl-3-amino-n-propyltrimethoxysilane, and an organic silicon compound having a group consisting of a polymer of hydrocarbon (all of these having SP value larger than 6.9).

These can be used singly or in combinations of two or more.

In addition, examples of the organic silicon compound having a group consisting of a polymer of hydrocarbon can include (meth)acrylates such as methyl (meth)acrylate, ethyl (meth)acrylate, butyl (meth)acrylate, 2-ethylhexyl (meth)acrylate, and cyclohexyl (meth)acrylate; carboxylic acids such as (meth)acrylic acid, itaconic acid, and fumaric acid, and acid anhydrides such as maleic acid anhydride; epoxy compounds such as glycidyl (meth)acrylate; amino compounds such as diethylaminoethyl (meth)acrylate and aminoethyl vinyl ether; amide compounds such as (meth)acrylamide, itaconic acid diamide, α-ethylacrylamide, crotonamide, fumaric acid diamide, maleic acid diamide, and N-butoxymethyl(meth)acrylamide; and a vinyl polymer obtained by copolymerizing a vinyl-based compound selected from acrylonitrile, styrene, α-methylstyrene, vinyl chloride, vinyl acetate, vinyl propionate, and the like is the R component in formula (I).

The organic silicon compound used is preferably a condensate.

The amount of the organic silicon compound and/or the condensate thereof blended in the solid content of the organic-inorganic complex-forming composition of the present invention is 1 to 95 mass %, and preferably 1 to 50 mass %, with respect to the total mass of the organic silicon compound and/or the condensate thereof, the silanol condensation catalyst, the thermosetting compound, and other components added as needed.

(Silanol Condensation Catalyst)

The condensate of the organic silicon compound of the present invention can be obtained by a condensation reaction of the organic silicon compound of formula (I) using a silanol catalyst.

Here, the silanol condensation catalyst is not particularly limited as long as it hydrolyzes the hydrolyzable group in the compound represented by formula (I), and condenses the silanol to form a siloxane bond, and examples thereof include a metal chelate compound, an organic acid metal salt, a metal compound having two or more hydroxyl groups or hydrolyzable groups (excluding a metal chelate compound and an organic acid metal salt), hydrolysates thereof and condensates thereof, an acid, and a base. The silanol condensation catalysts can be used singly or in combinations of two or more.

As the above-described metal chelate compound, a metal chelate compound having a hydroxyl group or a hydrolyzable group is preferable, and a metal chelate compound having two or more hydroxyl groups or hydrolyzable groups is more preferable. It is to be noted that having two or more hydroxyl groups or hydrolyzable groups means that the sum of hydrolyzable groups and hydroxyl groups is 2 or more. In addition, as the above-described metal chelate compound, a β-ketocarbonyl compound, a β-ketoester compound, and an α-hydroxyester compound are preferable, and specific examples thereof include β-ketoesters such as methyl acetoacetate, n-propyl acetoacetate, isopropyl acetoacetate, n-butyl acetoacetate, sec-butyl acetoacetate, and t-butyl acetoacetate; β-diketones such as acetylacetone, hexane-2,4-dione, heptane-2,4-dione, heptane-3,5-dione, octane-2,4-dione, nonane-2,4-dione, and 5-methyl-hexane-2,4-dione; and a compound to which a hydroxycarboxylic acid such as glycolic acid or lactic acid, or the like is coordinated.

The above-described organic acid metal salt is a compound consisting of a salt obtained from a metal ion and an organic acid, and examples of the organic acid include organic compounds exhibiting acidity, such as carboxylic acids such as acetic acid, oxalic acid, tartaric acid, and benzoic acid; sulfur-containing organic acids such as sulfonic acid and sulfinic acid; a phenol compound; an enol compound; an oxime compound; an imide compound; and an aromatic sulfonamide.

In addition, the above-described metal compound having two or more hydroxyl groups or hydrolyzable groups is one other than the above-described metal chelate compound and organic acid metal salt, and examples thereof can include a metal hydroxide, and metal alcoholates such as a metal propoxide, a metal isopropoxide, and a metal n-butoxide.

Examples of the hydrolyzable group in the above-described metal compound, the above-described metal chelate compound, or the above-described organic acid metal salt include an alkoxy group, an acyloxy group, a halogen group, and an isocyanate group, and an alkoxy group having 1 to 4 carbon atoms and an acyloxy group having 1 to 4 carbon atoms are preferable. It is to be noted that having two or more hydroxyl groups or hydrolyzable groups means that the sum of hydrolyzable groups and hydroxyl groups is 2 or more.

The hydrolysate and/or condensate of such a metal compound is preferably one obtained by hydrolyzing 1 mole of the metal compound having two or more hydroxyl groups or hydrolyzable groups, using 0.5 moles or more of water, and more preferably one obtained by hydrolyzing 1 mole of the metal compound having two or more hydroxyl groups or hydrolyzable groups, using 0.5 to 2 moles of water.

In addition, the hydrolysate and/or condensate of the metal chelate compound is preferably one obtained by hydrolyzing 1 mole of the metal chelate compound, using 5 to 100 moles of water, and more preferably one obtained by hydrolyzing 1 mole of the metal chelate compound, using 5 to 20 moles of water.

In addition, the hydrolysate and/or condensate of the organic acid metal salt is preferably one obtained by hydrolyzing 1 mole of the organic acid metal salt, using 5 to 100 moles of water, and more preferably one obtained by hydrolyzing 1 mole of the organic acid metal salt, using 5 to 20 moles of water.

In addition, examples of metal in the metal compound, the metal chelate compound, or the organic acid metal salt compound, include titanium (Ti), zirconium (Zr), aluminum (Al), silicon (Si), germanium (Ge), indium (In), tin (Sn), tantalum (Ta), zinc (Zn), tungsten (W), and lead (Pb), among these, titanium (Ti), zirconium (Zr), aluminum (Al), and tin (Sn) are preferable, and particularly, titanium (Ti) is preferable. One of these may be used alone or two or more thereof can also be used.

When the above-described metal compound is used, the silanol condensation catalyst is preferably a hydrolysate and/or condensate, and particularly preferably a hydrolysate and/or condensate of a metal chelate compound, and its average particle diameter is preferably 20 nm or less, and more preferably 10 nm or less. Accordingly, transparency of the organic-inorganic complex (organic-inorganic complex thin film) can be improved.

The average particle diameter can be measured using, for example, HPPS manufactured by Malvern Instruments Ltd.

Examples of the acid include an organic acid and a mineral acid, specific examples of the organic acid include acetic acid, formic acid, oxalic acid, carbonic acid, phthalic acid, trifluoroacetic acid, p-toluenesulfonic acid, and methanesulfonic acid, and specific examples of the mineral acid include hydrochloric acid, nitric acid, boric acid, and hydrofluoboric acid.

Here, the acid also includes a photo-acid-generating agent that generates an acid by light irradiation, specifically, diphenyliodonium hexafluorophosphate, triphenylphosphonium hexafluorophosphate, and the like.

Examples of the base include strong bases such as tetramethylguanidine and tetramethylguanidylpropyltrimethoxysilane; organic amines, a carboxylic acid neutralized salt of an organic amine, and a quaternary ammonium salt.

The blending ratio of the silanol condensation catalyst in the organic-inorganic complex-forming composition of the present invention is 1:99 to 99:1, and preferably 1:99 to 50:50, with respect to the mass of the organic silicon compound and/or the condensate thereof.

(Thermosetting Compound)

The thermosetting compound of the present invention is not particularly limited as long as it is a compound having a functional group that can be thermally-cured, and the thermosetting compound may be a low-molecular compound or a high-molecular compound.

Examples thereof include phenolic resins such as novolac-type phenolic resins such as a phenol novolac resin, a cresol novolac resin, and a bisphenol A novolac resin, and a resol-type phenolic resin; bisphenol-type epoxy resins such as a bisphenol A epoxy resin and a bisphenol F epoxy resin, novolac-type epoxy resins such as a novolac epoxy resin and a cresol novolac epoxy resin, epoxy resins such as a biphenyl-type epoxy resin, a stilbene-type epoxy resin, a triphenolmethane-type epoxy resin, an alkyl-modified triphenolmethane-type epoxy resin, a triazine nucleus-containing epoxy resin, and a dicyclopentadiene-modified phenol-type epoxy resin, and a compound having an epoxy group, such as 2,2-bis(4-glycidyloxyphenyl)propane. In addition, examples thereof include a urea resin; a resin having a triazine ring, such as a melamine resin; an unsaturated polyester resin; a bismaleimide resin; a polyurethane resin; a diallyl phthalate resin; a silicone resin; a resin having a benzoxazine ring; a cyanate ester resin, and raw material compounds of these resins.

In addition, examples thereof can also include bifunctional (meth)acrylate compounds such as 1,6-hexanediol di(meth)acrylate, ethylene glycol di(meth)acrylate, neopentyl glycol di(meth)acrylate, triethylene glycol di(meth)acrylate, bis(acryloyloxyethyl)ether of bisphenol A, and 3-methylpentanediol di(meth)acrylate; trifunctional or more, multifunctional (meth)acrylate compounds such as trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, a reactant of pentaerythritol tri(meth)acrylate and an acid anhydride, a reactant of dipentaerythritol penta(meth)acrylate and an acid anhydride, caprolactone-modified pentaerythritol tetra(meth)acrylate, caprolactone-modified dipentaerythritol penta(meth)acrylate, caprolactone-modified dipentaerythritol hexa(meth)acrylate, ethylene oxide-modified pentaerythritol tetra(meth)acrylate, ethylene oxide-modified dipentaerythritol penta(meth)acrylate, ethylene oxide-modified dipentaerythritol hexa(meth)acrylate, propylene oxide-modified dipentaerythritol penta(meth)acrylate, and propylene oxide-modified dipentaerythritol hexa(meth)acrylate; and acrylate compounds such as polyurethane (meth)acrylate, polyester (meth)acrylate, epoxy (meth)acrylate, polyamide (meth)acrylate, polybutadiene (meth)acrylate, polystyryl (meth)acrylate, polycarbonate diacrylate, and a siloxane polymer having a (meth)acryloyloxy group.

One of these or a mixture of two or more thereof can also be used.

The amount of the thermosetting compound blended in the solid content (total mass of the organic silicon compound and/or the condensate thereof, the silanol condensation catalyst, the thermosetting compound, and other components blended as needed) of the organic-inorganic complex-forming composition of the present invention is 2 to 99 mass %, preferably 50 to 99 mass %, more preferably 60 to 98 mass %, and further preferably 65 to 98%.

(Optional Components)

1) Thermal Polymerization Initiator

In the present invention, a thermal polymerization initiator can be added if needed.

The thermal polymerization initiator indicates a compound that generates a radial by the application of heat, and examples thereof include an organic peroxide, an azo compound, and a redox initiator.

Examples of the above-described organic peroxide include peroxides such as benzoyl peroxide, cumene hydroperoxide, di-t-butyl peroxide, t-butyl hydroperoxide, dicumyl peroxide, acetyl peroxide, lauroyl peroxide, cyclohexanone peroxide, dibenzoyl peroxide, and tert-butyl permaleate; peroxy carbonates such as 1,6 bis(t-butyl peroxycarbonyloxy)hexane; peroxy ketal; and persulfates such as potassium persulfate, sodium persulfate, and ammonium persulfate.

Examples of the above-described azo compound include 2,2'-azobispropane, 2,2'-dichloro-2,2'-azobispropane, 1,1'-azo(methylethyl)diacetate, 2,2'-azobisisobutane, 2,2'-azobisisobutylamide, 2,2'-azobisisobutyronitrile (AIBN), methyl 2,2'-azobis-2-methylpropionate, 2,2'-dichloro-2,2'-azobisbutane, 2,2'-azobis-2-methylbutyronitrile, dimethyl 2,2'-azobis(isobutyrate), 3,5-dihydroxymethylphenylazo-2-methylmalonodinitrile, 2,2'-azobis-2-methylvaleronitrile, 4,4'-azobis-4-cyanovaleric acid dimethyl, and 2,2'-azobis-2,4-dimethylvaleronitrile.

Examples of the above-described redox initiator include combinations such as hydrogen peroxide—an iron (II) salt, an organic peroxide-dimethylaniline, and a cerium (IV) salt—an alcohol.

The amount of the polymerization initiator used in the present invention blended is preferably 0.01 to 20 mass %, and further preferably 0.1 to 10 mass %, with respect to the solid content of the thermosetting compound.

2) Curing Agent or Curing Accelerator

In the present invention, a curing agent or a curing accelerator may be added if needed.

Although not particularly limited, examples of the curing agent include amine-based, imidazole-based, amide-based, ester-based, alcohol-based, thiol-based, ether-based, thio-ether-based, phenol-based, phosphorous-based, urea-based, thiourea-based, acid anhydride-based, Lewis acid-based, onium salt-based, and active silicon compound-aluminum complex-based compounds, and from conventional ones commonly used as a curing agent and a curing accelerator of an epoxy resin and the like, an optional one can be selected and used.

As the amine-based compound, for example, aliphatic amine-based, alicyclic and heterocyclic amine-based, aromatic amine-based, and modified amine-based compounds, and the like are used. Examples thereof include aliphatic amines: ethylenediamine, trimethylenediamine, tetramethylenediamine, hexamethylenediamine, diethylenetriamine, triethylenetetramine, tetraethylenepentamine, dipropylenediamine, dimethylaminopropylamine, diethylaminopropylamine, trimethylhexamethylenediamine, pentanediamine, bis(2-dimethylaminoethyl)ether, pentamethyldiethylenetriamine, alkyl-t-monoamine, 1,4-diazabicyclo(2,2,2)octane(triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dimethylaminoethoxyethoxyethanol, and dimethylaminohexanol, alicyclic and heterocyclic amines: piperidine, piperazine, menthanediamine, isophoronediamine, methylmorpholine, ethylmorpholine, N,N',N''-tris(dimethylaminopropyl)hexahydro-s-triazine, a 3,9-bis(3-aminopropyl)-2,4,8,10-tetraoxyspiro(5,5)undecane adduct, N-aminoethylpiperazine, trimethylaminoethylpiperazine, bis(4-aminocyclohexyl)methane, N,N'-dimethylpiperazine, and 1,8-diazabicyclo(4,5,0)undecene-7, aromatic amines: o-phenylenediamine, m-phenylenediamine, p-phenylenediamine, diaminodiphenylmethane, diaminodiphenylsulfone, benzylmethylamine, dimethylbenzylamine, m-xylenediamine, pyridine, and picoline, modified polyamines: epoxy compound addition polyamine, Michael addition polyamine, Mannich addition polyamine, thiourea addition polyamine, ketone-blocked polyamine, and as other amine-based compounds, dicyandiamide, guanidine, organic acid hydrazide, diaminomaleonitrile, aminimide, a borontrifluoride-piperidine complex, and a borontrifluoride-monoethylamine complex.

Examples of the imidazole-based compound can include imidazole, 2-methylimidazole, 2-ethylimidazole, 2-isopropylimidazole, 2-n-propylimidazole, 2-undecyl-1H-imidazole, 2-heptadecyl-1H-imidazole, 1,2-dimethylimidazole, 2-ethyl-4-methylimidazole, 2-phenyl-1H-imidazole, 4-methyl-2-phenyl-1H-imidazole, 2-phenyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-ethyl-4-methylimidazolium trimellitate, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-(2'-undecylimidazolyl-)-ethyl-s-triazine, 2,4-diamino-6-[2'-ethyl-4-imidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, a 2-methylimidazole isocyanuric acid adduct, 2-phenyl-4,5-dihydroxymethyl imidazole, 2-phenyl-4-methyl-5-hydroxymethyl imidazole, 1-cyanoethyl-2-phenyl-4,5-di(2-cyanoethoxy)methylimidazole, 1-dodecyl-2-methyl-3-benzylimidazolium chloride, 1-benzyl-2-phenylimidazole hydrochloride, and 1-benzyl-2-phenylimidazolium trimellitate.

Examples of an imidazoline-based compound include 2-methylimidazoline and 2-phenylimidazoline.

Examples of the amide-based compound include a polyamide obtained by condensation of a dimer acid and a polyamine, and examples of the ester-based compound include active carbonyl compounds, such as aryl and thioaryl esters of carboxylic acids. Furthermore, examples of the phenol, alcohol-based, thiol-based, ether-based, and thioether-based compounds include phenol novolac, cresol novolac, a polyol, a polymercaptan, a polysulfide, 2-(dimethylaminomethylphenol), 2,4,6-tris(dimethylaminomethyl) phenol, and tri-2-ethylhexyl hydrochloride of 2,4,6-tris(dimethylaminomethyl)phenol.

In addition, examples of the urea-based, thiourea-based, and Lewis acid-based curing agents include butylated urea, butylated melamine, butylated thiourea, and boron trifluoride.

Examples of the phosphorous-based curing agent include organic phosphine compounds, for example, alkyl phosphines such as ethyl phosphine and butyl phosphine, primary phosphines such as phenyl phosphine, dialkyl phosphines such as dimethyl phosphine and dipropyl phosphine, secondary phosphines such as diphenyl phosphine and methylethyl phosphine, and tertiary phosphines such as trimethyl phosphine and triethyl phosphine, and examples of the acid anhydride-based curing agent include phthalic anhydride, hexahydrophthalic anhydride, methyltetrahydrophthalic anhydride, methylhexahydrophthalic anhydride, endomethylenetetrahydrophthalic anhydride, methylendomethylenetetrahydrophthalic anhydride, maleic anhydride, tetramethylenemaleic anhydride, trimellitic anhydride, chlorendic anhydride, pyromellitic anhydride, dodecenyl succinic anhydride, benzophenonetetracarboxylic anhydride, ethylene glycol bis(anhydro trimellitate), methylcyclohexenetetracarboxylic anhydride, and polyazelaic anhydride.

Examples of the onium salt-based and active silicon compound-aluminum complex-based curing agents include an aryldiazonium salt, a diaryliodonium salt, a triarylsulfonium salt, a triphenylsilanol-aluminum complex, a triphenylmethoxysilane-aluminum complex, a silyl peroxide-aluminum complex, and a triphenylsilanol-tris(salicylaldehydato)aluminum complex.

The amount of the curing agent or the curing accelerator used in the present invention blended is preferably 0.01 to 20 mass %, and further preferably 0.1 to mass %, with respect to the solid content of the thermosetting compound.

3) Metal Compound Particles

In the present invention, metal compound particles may be added if needed.

The metal compound particles are not particularly limited as long as they can form irregularities on the surface of the organic-inorganic complex film to be formed, to some extent, specific examples thereof can include aggregative metal compound particles and metal compound particles having a relatively large particle diameter, and a mixture of metal compound particles having an isoelectric point of less than 5 as a metal oxide and metal compound particles having an isoelectric point of larger than 5 as a metal oxide is preferable.

Examples of metal of the metal compound particles having an isoelectric point of less than 5 as a metal oxide include silicon, tungsten, and antimony, and examples of the metal compound include metal oxides such as silica, tungsten oxide, and antimony oxide.

On the other hand, examples of metal of the metal compound particles having an isoelectric point of 5 or more as a metal oxide include zirconium, aluminum, titanium, magnesium, iron, tin, zinc, cadmium, nickel, copper, beryllium, ruthenium, thorium, yttrium, mercury, cesium, chromium, and lanthanum, and examples of the metal compound include metal oxides such as zirconia, alumina, titania, magnesium oxide, tin oxide, zinc oxide, cadmium oxide, yttrium oxide, nickel oxide, copper oxide, beryllium oxide, ruthenium oxide, thorium oxide, mercury oxide, cerium oxide, and chromium oxide, and magnesium fluoride.

The metal compound particles are preferably a mixed sol of silica and at least one selected from zirconia, alumina, and titania, and more preferably a mixed sol of a silica sol and a zirconia sol.

The mixing ratio of the metal compound particles having an isoelectric point of less than 5 as a metal oxide to the metal compound particles having an isoelectric point of 5 or more is 1:99 to 99:1, preferably 50:50 to 99:1, and more preferably 80:20 to 99:1, in terms of the weight ratio of the solid content.

The metal compound particles used are not particularly limited if they are secondary particles or primary particles, and they are preferably primary particles.

The particle diameter of the metal compound is not particularly limited, and the average primary particle diameter is preferably in the range of 1 nm to 100 nm, and further preferably in the range of 1 nm to 50 nm.

In addition, the property of the metal compound particles may be a sol or a powder, and usually, a sol is preferably used. A sol is usually a colloidal dispersion solution, and therefore, a uniform dispersion solution can be easily formed by simply mixing the sol with other components, and furthermore, there are few problems of becoming non-uniform due to settling or the like.

In addition, one in which the surface of each metal compound particle is surface-modified with a silane coupling agent or the like can be used, and specific examples thereof include a silica sol that is subjected to hydrophobic treatment with a hydrocarbon group or the like.

The amount of the metal compound particles blended in the solid content of the organic-inorganic complex-forming composition of the present invention is 0.1 to 50 mass %, and preferably 0.1 to 25 mass %, with respect to the total mass of the organic silicon compound and/or the condensate thereof, the silanol condensation catalyst, the thermosetting compound, and the like.

4) Solvent

A solvent used in the present invention is not particularly limited, and examples thereof include water; aromatic hydrocarbons such as benzene, toluene, and xylene; aliphatic hydrocarbons such as hexane and octane; alicyclic hydrocarbons such as cyclohexane and cyclopentane; ketones such as acetone, methyl ethyl ketone, and cyclohexanone; ethers such as tetrahydrofuran and dioxane; esters such as ethyl acetate and butyl acetate; amides such as N,N-dimethylformamide and N,N-dimethylacetamide; sulfoxides such as dimethylsulfoxide; alcohols such as methanol and ethanol; and polyhydric alcohol derivatives such as ethylene glycol monomethyl ether and ethylene glycol monomethyl ether acetate. These solvents can be used singly or in combinations of two or more.

5) Other Components that can be Contained

In addition, a filler can also be separately added and dispersed in the organic-inorganic complex-forming composition of the present invention so as to exhibit various properties such as coloration of a coating film to be obtained, film thickening, prevention of transmission of ultraviolet rays to a base, imparting of an anticorrosion property, and a heat resistance property. Regarding oxides, there may be descriptions overlapping with those of the above-described metal compound particles.

Examples of this filler include water-insoluble pigments such as organic pigments and inorganic pigments, or particulate, fibrous, or scaly metals and alloys and oxides, hydroxides, carbides, nitrides, and sulfides thereof other than pigments. Specific examples of this filler can include particulate, fibrous, or scaly iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomaceous earth, slaked lime, gypsum, talc, barium carbonate, calcium carbonate, magnesium carbonate, barium sulfate, bentonite, mica, zinc green, chromium green, cobalt green, viridian, Guignet green, cobalt chromium green, Scheele's green, green earth, manganese green, pigment green, ultramarine blue, Prussian blue, blue verditer, cobalt blue, cerulean blue, copper borate, molybdenum blue, copper sulfide, cobalt violet, mars violet, manganese violet, pigment violet, lead suboxide, calcium plumbate, zinc yellow, lead sulfide, chromium yellow, ocher, cadmium yellow, strontium yellow, titanium yellow, litharge, pigment yellow, copper suboxide, cadmium red, selenium red, chromium vermilion, colcothar, zinc white, antimony white, basic lead sulfate, titanium white, lithopone, lead silicate, zircon oxide, tungsten white, lead zinc flower, Bantison white, lead phthalate, manganese white, lead sulfate, graphite, bone black, diamond black, thermatomic black, vegetable black, potassium titanate whisker, and molybdenum disulfide.

It is to be noted that additives such as known dehydrating agents such as methyl orthoformate, methyl orthoacetate, and tetraethoxysilane, various surfactants, silane coupling agents other than the above, titanium coupling agents, dyes, dispersing agents, thickening agents, and leveling agents can also be further added to the organic-inorganic complex-forming composition of the present invention.

(Method for Preparing Organic-Inorganic Complex-Forming Composition)

As a method for preparing the organic-inorganic complex-forming composition of the present invention, an organic silicon compound and/or a condensate thereof, a silanol catalyst, a thermosetting compound, and if needed, a polymerization initiator, a curing agent, a curing accelerator, a solvent, and other optional components are mixed.

Specifically, for example, a silanol catalyst is mixed with a solvent, a predetermined amount of water is added to perform (partial) hydrolysis, and then, an organic silicon compound is added to be (partially) hydrolyzed. On the other hand, a thermosetting compound and, if needed, a polymerization initiator or the like are dissolved in a solvent, and both solutions are mixed. At this time, the organic silicon compound hydrolyzed by the silanol condensation catalyst can be directly mixed with the thermosetting compound without removing a solvent or water. In addition, these components can be mixed at the same time. Examples of the method for mixing the organic silicon compound and the silanol catalyst can include a method of mixing the organic silicon compound and the silanol catalyst and then adding water to perform (partial) hydrolysis, and a method of mixing the organic silicon compound and the silanol catalyst which are separately (partially) hydrolyzed. It is not always necessary to add water or a solvent, but it is preferable to add water to form a (partial) hydrolysate. Although the amount of the predetermined amount of water depends on the kind of the silanol catalyst, for example, when the silanol catalyst is a metal compound having two or more hydroxyl groups or hydrolyzable groups, 0.5 moles or more of water is preferably used, and 0.5 to 2 moles of water is more preferably used, with respect to 1 mole of the metal compound. In addition, when the silanol catalyst is a metal chelate compound or a metal organic acid salt compound, 5 to 100 moles of water is preferably used, and 5 to 20 moles of water is more preferably used, with respect to 1 mole of the metal chelate compound or the metal organic acid salt compound.

(Organic-Inorganic Complex)

An organic-inorganic complex of the present invention comprises:

a) a condensate of an organic silicon compound that is at least one represented by formula (I)

$R_nSiX_{4-n}$     (I)

(wherein R represents an organic group having a carbon atom directly bonded to Si, and X represents a hydroxyl group or a hydrolyzable group; and n represents 1 or 2, wherein when n is 2, each R is the same or different, and when (4−n) is 2 or more, each X may be the same or different) and having a solubility parameter (SP1) of R obtained by Fedors' estimation method smaller than a solubility parameter (SP2) of a thermosetting compound obtained by Fedors' estimation method, and a difference between the SP1 and the SP2 is 1.6 or more (Si1);

b) a silanol condensation catalyst; and c) a cured material of the thermosetting compound (excluding a cured material of an olefin polymer).

The organic silicon compound used in the present invention may further comprise one having SP1 smaller than SP2 and the difference between the SP1 and the SP2 is less than 1.6 or one having SP1 larger than SP2 (Si2), and a ratio of Si1 to Si2 (Si1:Si2) is 5:5 to 10:0, and preferably 9:1 to 10:0.

The organic-inorganic complex of the present invention includes one in which a silanol condensation catalyst (including a derivative in which the catalyst structure is changed) is dispersed in a non-bonded state in a condensate of an organic silicon compound, one in which a silanol condensation catalyst (including a derivative in which the catalyst structure is changed) is bonded to a condensate of an organic silicon compound (for example, one having a Si—O-M bond (M represents a metal atom in a silanol condensation catalyst)), and one consisting of a mixture state thereof.

(Laminated Body Having Organic-Inorganic Complex Thin Film)

Specific examples of the above-described organic-inorganic complex of the present invention include a molded body that is molded by being cast in a mold, and a thin film formed by being applied on a base substance. When the thin film is formed, the method is not particularly limited as long as it is a method of drying and/or heating after the application on the base substance.

Pencil hardness in conformity with JIS K 5600-5-4 Pencil method when the thin film after drying is formed on a glass substrate is about 1H to 4H, and is preferably 2H to 4H from the viewpoints of adhesiveness to the substrate and hardness.

Examples of the base substance on which the thin film of the present invention can be formed include metal, ceramics, glass, and plastic. Conventionally, the formation of a thin film on a plastic base substance has been difficult, and a base substance has been limited to an inorganic base substance such as glass, but the thin film of the present invention can be easily film-formed even on a plastic base substance on which it is difficult to form a thin film, and is also suitable for plastic optical components. Examples of such plastic include an olefin resin, a polycarbonate resin, an acrylic resin, a polyimide resin, a polyester resin, an epoxy resin, a liquid crystal polymer resin, and polyethersulfone.

In addition, as a method for applying the organic-inorganic complex-forming composition, known application methods can be used, and examples thereof can include a dipping method, a spraying method, a bar coating method, a roll coating method, a spin coating method, a curtain coating method, a gravure printing method, a silk screen method, and an ink jet method. In addition, the thickness of the film to be formed is not particularly limited, and is, for example, about 0.05 to 200 μm.

In addition, the organic-inorganic complex thin film of the present invention has a structure in which the carbon content in the film surface part is smaller compared to the carbon content in the film back surface part, and the minimum value of the carbon content between the film surface and 0.5 μm in the depth direction is more preferably 80% or less, and further preferably 2 to 60%, of the carbon content at the film back surface side. Here, the carbon content in the film surface part being smaller compared to the carbon content in the film back surface part means that the total amount of carbon between the film surface and a film central part is smaller than the total amount of carbon between the film back surface and the film central part.

In addition, in the organic-inorganic complex thin film of the present invention, the carbon content gradually increases from the film surface to a predetermined depth, such a depth in which the carbon content gradually increases is preferably 5 to 80%, and more preferably 10 to 50%, of the film thickness, and specifically, for example, when the film thickness is about 1 to 2.5 μm, the depth in which the carbon content gradually increases is about 50 to 2000 nm.

The carbon content can be measured by ESCA analysis or the like.

Here, the "carbon content" means the molar concentration of carbon atoms if (all metal atoms+oxygen atoms+carbon atoms) is 100%. The same is true in the concentration of another element.

(Method for Producing Organic-Inorganic Complex and Organic-Inorganic Complex Thin Film)

Examples of a method for producing the organic-inorganic complex and the organic-inorganic complex thin film of the present invention can include a method of heating an organic silicon compound and/or a condensate thereof in the presence of a silanol catalyst, a thermosetting compound, and if needed, a polymerization initiator and the like, and the organic-inorganic complex-forming composition described below can be used.

EXAMPLES

Hereinafter, the present invention will be described more specifically by Examples, but the technical scope of the present invention is not limited to these illustrations.

Example 1

1) Preparation of Polysiloxane 17.00 g of methyltrimethoxysilane (Shin-Etsu Chemical Co., Ltd., KBM-13) was charged in a 140 mL mayonnaise bottle. 3.02 g of diisopropoxybisacetylacetonatotitanium (Nippon Soda Co., Ltd., T-50, the amount of the solid content in terms of $TiO_2$: 16.5 wt %) was added so as to be 5 mol % in terms of $TiO_2$ with respect to methyltrimethoxysilane. 19.91 g of MIBK was charged and stirred for 15 minutes (rate of stirring of 100 rpm).

4.50 g of distilled water was charged so as to be 2 times the mole of methyltrimethoxysilane, and a hydrolysis reaction was performed (2 hours, rate of stirring of 100 rpm). The liquid temperature rose to 40° C. at this time. After completion of the reaction, the reaction liquid was left for 30 minutes until the liquid temperature became 25° C.

2) Preparation of Organic-Inorganic Complex

In order to be dipentaerythritolhexaacrylate (Daicel-Cytec Company Ltd., DPHA, SP value of 10.40)/polysiloxane=90 wt %/10 wt %, 17.37 g of DPHA and 9.65 g of polysiloxane were mixed, and then, diluted with 22.29 g of MIBK. 0.69 g of dicumyl peroxide (NOF CORPORATION, PERCUMYL D) was added so as to be 4 wt % with respect to the solid content of DPHA. A coating agent having a solid content of 40 wt % was obtained.

3) Formation of Thin Film

Figure 1:
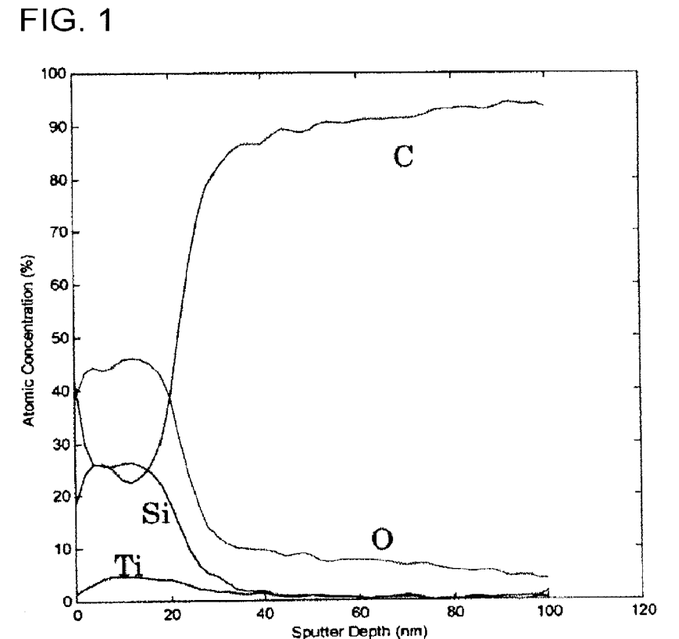
FIG. 1 is a diagram showing distribution of respective film components of a thin film in the film thickness direction, measured by ESCA, in Example 1.

A thin film was formed by bar coating on a stainless-steel plate to be 5 μm, and heated at 150° C. for minutes by a hot-air circulation-type dryer. Distribution of respective film components of the thin film in the film thickness direction was measured by ESCA. The result is shown in FIG. 1.

Example 2

1) Preparation of Polysiloxane 17.00 g of methyltrimethoxysilane (Shin-Etsu Chemical Co., Ltd., KBM-13) was charged in a 140 mL mayonnaise bottle. 3.02 g of diisopropoxybisacetylacetonatotitanium (Nippon Soda Co., Ltd., T-50, the amount of the solid content in terms of $TiO_2$: 16.5 wt %) was added so as to be 5 mol % in terms of $TiO_2$ with respect to methyltrimethoxysilane. 19.91 g of MIBK was charged and stirred for 15 minutes (rate of stirring of 100 rpm).

4.50 g of distilled water was charged so as to be 2 times the mole of methyltrimethoxysilane, and a hydrolysis reaction was performed (2 hours, rate of stirring of 100 rpm). The liquid temperature rose to 40° C. at this time. After completion of the reaction, the reaction liquid was left for 30 minutes until the liquid temperature became 25° C.

2) Preparation of Organic-Inorganic Complex

In order to be VYLON 600 (registered trademark, TOYOBO CO., LTD, amorphous polyester resin)/polysiloxane=wt %/10 wt %, 17.37 g of VYLON 600 and 9.65 g of polysiloxane were mixed, and then, diluted with 22.29 g of MIBK. A coating agent having a solid content of 40 wt % was obtained.

3) Formation of Thin Film

Figure 2:
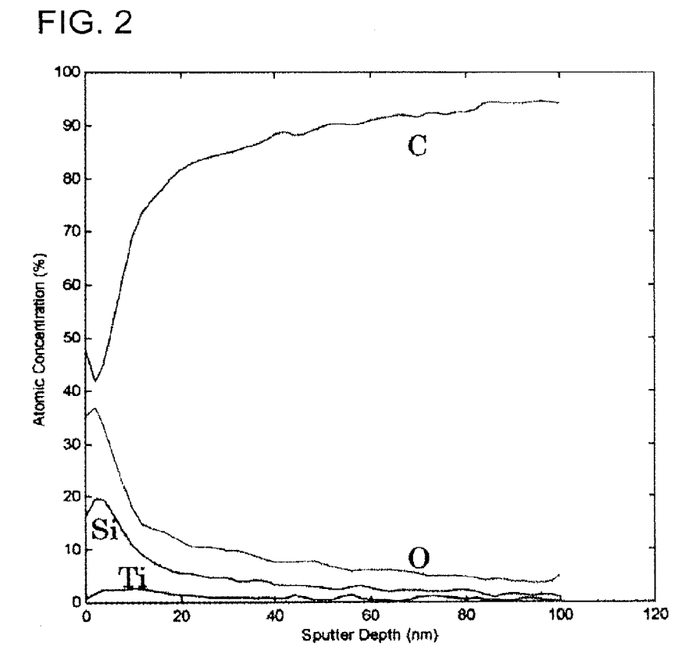
FIG. 2 is a diagram showing distribution of respective film components of a thin film in the film thickness direction, measured by ESCA, in Example 2.

A thin film was formed by bar coating on a stainless-steel plate to be 5 μm, and heated at 150° C. for minutes by a hot-air circulation-type dryer. Distribution of respective film components of the thin film in the film thickness direction was measured by ESCA. The result is shown in FIG. 2.

Example 3

1) Preparation of Polysiloxane 17.00 g of methyltrimethoxysilane (Shin-Etsu Chemical Co., Ltd., KBM-13) was charged in a 140 mL mayonnaise bottle. 3.02 g of diisopropoxybisacetylacetonatotitanium (Nippon Soda Co., Ltd., T-50, the amount of the solid content in terms of TiO$_2$: 16.5 wt %) was added so as to be 5 mol % in terms of TiO$_2$ with respect to methyltrimethoxysilane. 19.91 g of MIBK was charged and stirred for 15 minutes (rate of stirring of 100 rpm).

4.50 g of distilled water was charged so as to be 2 times the mole of methyltrimethoxysilane, and a hydrolysis reaction was performed (2 hours, rate of stirring of 100 rpm). The liquid temperature rose to 40° C. at this time. After completion of the reaction, the reaction liquid was left for 30 minutes until the liquid temperature became 25° C. After that, water and an alcohol were removed by dehydrating distillation.

2) Preparation of Organic-Inorganic Complex

In order to be T-150 (Nippon Soda Co., Ltd., NISSO TITA BOND)+T-122 (Nippon Soda Co., Ltd., NISSO TITA BOND)/polysiloxane=90 wt %/10 wt %, 16.73 g of T-150, 16.73 g of T-122, and 9.29 g of polysiloxane were mixed, and then, diluted with 5.90 g of ethyl acetate. A coating agent having a solid content of 40 wt % was obtained.

3) Formation of Thin Film

Figure 3:
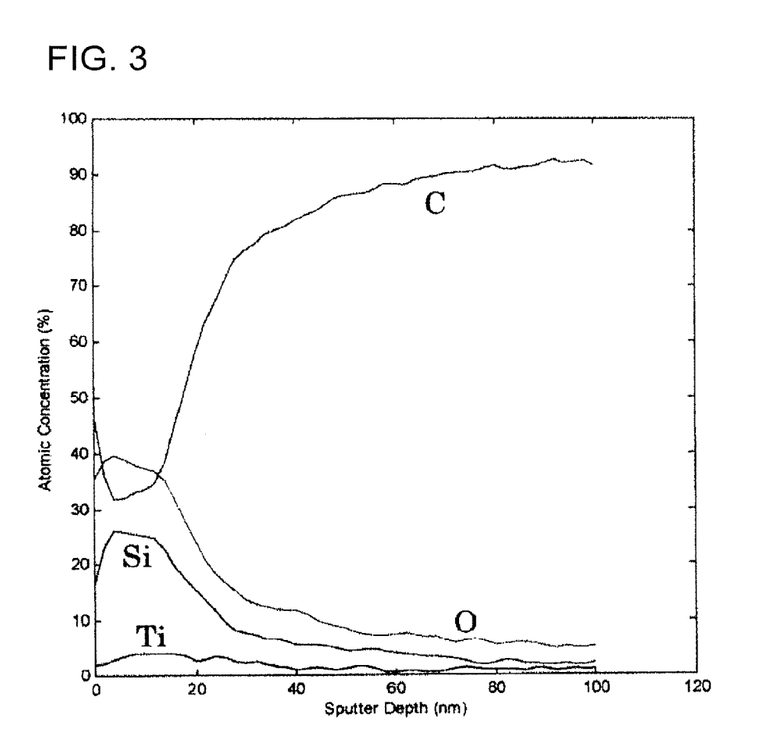
FIG. 3 is a diagram showing distribution of respective film components of a thin film in the film thickness direction, measured by ESCA, in Example 3.

A thin film was formed by bar coating on a stainless-steel plate to be 5 μm, and heated at 150° C. for minutes by a hot-air circulation-type dryer. Distribution of respective film components of the thin film in the film thickness direction was measured by ESCA. The result is shown in FIG. 3.

Example 4

1) Preparation of Polysiloxane 38.26 g of methyltrimethoxysilane (Shin-Etsu Chemical Co., Ltd., KBM-13) was charged in a 140 mL mayonnaise bottle. 6.80 g of diisopropoxybisacetylacetonatotitanium (Nippon Soda Co., Ltd., T-50, the amount of the solid content in terms of TiO$_2$: 16.5 wt %) was added so as to be 5 mol % in terms of TiO$_2$ with respect to methyltrimethoxysilane. 47.35 g of ethanol was charged and stirred for 15 minutes (rate of stirring of 100 rpm).

7.59 g of distilled water was charged so as to be 1.5 times the mole of methyltrimethoxysilane, and a hydrolysis reaction was performed (2 hours, rate of stirring of 100 rpm). The liquid temperature rose to 32° C. at this time. After completion of the reaction, the reaction liquid was left for 30 minutes until the liquid temperature became 25° C. A polysiloxane solution having a solid content concentration of 20 wt % was obtained.

2) Preparation of Organic-Inorganic Complex

In order to be 2,2-bis(4-glycidyloxyphenyl)propane (Tokyo Chemical Industry Co., Ltd, SP value of 10.40)/polysiloxane=90 wt %/10 wt %, 17.75 g of 2,2-bis(4-glycidyloxyphenyl)propane and 7.75 g of polysiloxane were mixed, and then, diluted with 17.75 g of MIBK. 0.56 g of 2-ethyl-4-methylimidazole (SHIKOKU CHEMICALS CORPORATION) was added so as to be 4 wt % with respect to the solid content of 2,2-bis(4-glycidyloxyphenyl)propane. A coating agent having a solid content of 40.1 wt % was obtained.

3) Formation of Thin Film

Figure 4:
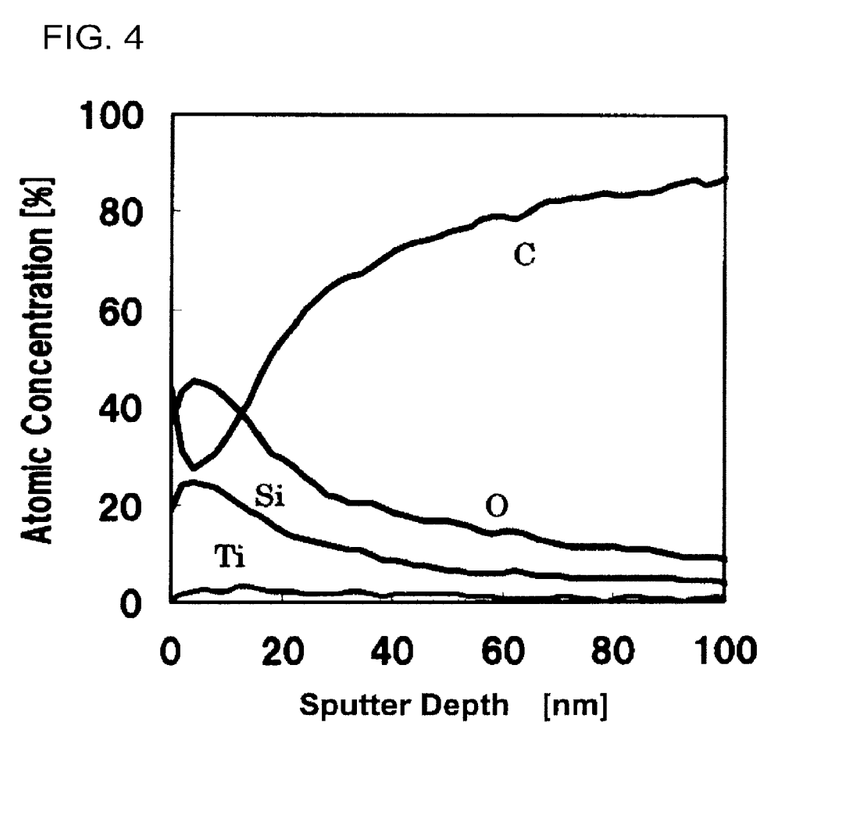
FIG. 4 is a diagram showing distribution of respective film components of a thin film in the film thickness direction, measured by ESCA, in Example 4.

A thin film was formed by bar coating on a stainless-steel plate to be 5 μm, and heated at 130° C. for minutes by a hot-air circulation-type dryer. Distribution of respective film components of the thin film in the film thickness direction was measured by ESCA. The result is shown in FIG. 4.

The invention claimed is:

1. A method for producing an organic-inorganic complex having a segregation layer of polysiloxane formed on a surface layer of the organic-inorganic complex, the method comprising:

heating to thermally-cure an organic-inorganic complex-forming composition, thereby forming the organic-inorganic complex having the segregation layer, the composition comprising:

a) a first organic silicon compound represented by formula (I) and/or a condensate thereof:

$$R_nSiX_{4-n} \quad (I)$$

wherein:

R represents a hydrocarbon group having 1 to 30 carbon atoms, excluding an ethenyl group and a (meth)acryloxy group, wherein the hydrocarbon group is optionally substituted with a halogen atom and has a carbon atom directly bonded to Si, each X independently represents a hydroxyl group or a hydrolyzable group, n represents 1 or 2, and when n is 2, each R is the same or different;

b) an optional second organic silicon compound represented by formula (I) and/or a condensate thereof; and c) a thermosetting compound, excluding an olefin polymer;

wherein:

the thermosetting compound has a solubility parameter (SP2) obtained by Fedors' estimation method;

the first organic silicon compound has a solubility parameter (SP1) of R obtained by Fedors' estimation method, and SP2−SP1≥1.6;

the optional second organic silicon compound has a solubility parameter (SP3) of R obtained by Fedors' estimation method, and SP2−SP3<1.6; and a molar ratio of the first organic silicon compound to the optional second organic silicon compound is 5:5 to 10:0.

2. The method for producing an organic-inorganic complex according to claim 1, wherein R represents an alkyl group having 1 to 10 carbon atoms, a cycloalkyl group having 3 to 8 carbon atoms, a straight chain or branched chain alkenyl group having 3 to 10 carbon atoms, a cycloalkenyl group having 3 to 8 carbon atoms, an aryl group having 6 to 10 carbon atoms, an arylalkyl group in which the aryl portion has 6 to 10 carbon atoms and the alkyl portion has 1 to 8 carbon atoms, or an arylalkenyl group in which the aryl portion has 6 to 10 carbon atoms and the alkenyl portion has 2 to 8 carbon atoms, each group being optionally substituted with a halogen atom and having a carbon atom directly bonded to Si.

3. The method for producing an organic-inorganic complex according to claim 2, wherein the thermosetting compound is not a siloxane polymer having a (meth)acryloyloxy group, or a silicone resin.

4. The method for producing an organic-inorganic complex according to claim 1, wherein the thermosetting compound is not a siloxane polymer having a (meth)acryloyloxy group, or a silicone resin.

* * * * *

UNITED STATES PATENT AND TRADEMARK OFFICE
CERTIFICATE OF CORRECTION

PATENT NO. : 9,790,400 B2
APPLICATION NO. : 15/156092
DATED : October 17, 2017
INVENTOR(S) : Taiki Yamate It is certified that error appears in the above-identified patent and that said Letters Patent is hereby corrected as shown below:

In the Specification

Column 5, Line 55, "a kept-1-en-1-yl group, a kept-6-en-1-yl group" should read --a hept-1-en-1-yl group, a hept-6-en-1-yl group--.

Column 7, Line 8, "a kept-6-en-1-yl group" should read --a hept-6-en-1-yl group--.

Column 14, Line 5, "and further preferably 0.1 to mass %" should read --and further preferably 0.1 to 10 mass %--.

Column 18, Line 50, "and heated at 150° C. for minutes" should read --and heated at 150° C. for 30 minutes--.

Column 19, Line 8, "polysiloxane=wt %/10 wt %" should read --polysiloxane = 90 wt %/10 wt %--;
    Line 14, "and heated at 150° C. for minutes" should read --and heated at 150° C. for 30 minutes--; and
    Line 47, "and heated at 150° C. for minutes" should read --and heated at 150° C. for 30 minutes--.

Column 20, Line 16, "and heated at 130° C. for minutes" should read --and heated at 130° C. for 10 minutes--.

Signed and Sealed this
Fourteenth Day of May, 2019

Andrei Iancu
*Director of the United States Patent and Trademark Office*